US011896952B1

(12) United States Patent
Saleem et al.

(10) Patent No.: US 11,896,952 B1
(45) Date of Patent: Feb. 13, 2024

(54) ADSORBENT USING BIOWASTE AND PLASTIC WASTE FOR WASTEWATER TREATMENT

(71) Applicant: KING FAISAL UNIVERSITY, Al-Ahsa (SA)

(72) Inventors: Junaid Saleem, Doha (QA); Sk Safdar Hossain, Hofuf (SA); Zubair Khalid Baig Moghal, Doha (QA); Gordon McKay, Doha (QA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/379,374

(22) Filed: Oct. 12, 2023

(51) Int. Cl.
*B01J 20/20* (2006.01)
*B01J 20/26* (2006.01)
*C02F 1/28* (2023.01)
*B01J 20/28* (2006.01)
*B01J 20/30* (2006.01)
*C02F 101/30* (2006.01)

(52) U.S. Cl.
CPC ......... *B01J 20/261* (2013.01); *B01J 20/20* (2013.01); *B01J 20/28004* (2013.01); *B01J 20/28016* (2013.01); *B01J 20/305* (2013.01); *B01J 20/3078* (2013.01); *B01J 20/3085* (2013.01); *C02F 1/288* (2013.01); *C02F 1/283* (2013.01); *C02F 1/285* (2013.01); *C02F 2101/308* (2013.01)

(58) Field of Classification Search
CPC .... B01J 20/261; B01J 20/20; B01J 20/28004; B01J 20/28016; B01J 20/305; B01J 20/3078; B01J 20/3085; C02F 1/288
See application file for complete search history.

(56) References Cited

U.S. PATENT DOCUMENTS

| | | | | |
|---|---|---|---|---|
| 4,965,294 A * | 10/1990 | Ohngemach | ............ | G03F 7/031 522/79 |
| 6,472,343 B1 * | 10/2002 | McCrae | ............... | B01J 20/3289 502/402 |
| 2005/0211945 A1 * | 9/2005 | Coppens | ............. | D06M 15/277 252/8.57 |
| 2006/0121389 A1 * | 6/2006 | Anzures | ................ | G03F 7/2018 430/273.1 |
| 2021/0090617 A1 * | 3/2021 | Sity | ..................... | G11C 11/1657 |
| 2022/0096981 A1 * | 3/2022 | Samanta | ................ | B01D 53/02 |

OTHER PUBLICATIONS

H.M. Abd El Salam, "BioSustainable Alternatives Synthesis of Nanoporous Activated Carbon @AIMOF for the Adsorption of Hazardous Organic Dyes from Wastewater", Water Air Soil Pollut 234, 567(2023), pp. 1-14, First available online Aug. 18, 2023.
Mohammad Azam, "Lemon Peel Activated Carbon: An Efficient Adsorbent for Removal of Textile Dye from Aqueous Solution", Test Engineering & Management., vol. 82, pp. 4138-4145, First available online Jan. 21, 2020.
Varsha Joshi et al., "Analysis of Watermelon Peel and Lemon Peel as Low Cost Noval Bioadsorbents", Journal of University of Shanghai for Science and Technology, vol. 22, Issue 11, pp. 483-499, First available online Mar. 8, 2022.
Denga Ramutshatsha-Makhwedzha et al., "Activated carbon derived from waste orange and lemon peels for the adsorption of methyl orange and methylene blue dyes from wastewater", Heliyon, vol. 8, Issue 8, (2022), pp. 1-9, First available online Jul. 9, 2022.
Aysha Bukhari et al., "Removal of Eosin dye from simulated media onto lemon peel-based low cost biosorbent", Arabian Journal of Chemistry, vol. 15, Issue 7, pp. 1-12, First available online Apr. 4, 2022.
Suria Fatin Mohd Din et al., "Recycled Poly(ethylene terephthalate) as Dye Adsorbent : A Mini-Review", Chemical Engineering Transactions, vol. 78, pp. 367-372, First available online Feb. 1, 2020.

* cited by examiner

*Primary Examiner* — Chester T Barry
(74) *Attorney, Agent, or Firm* — Nath, Goldberg & Meyer; Richard C. Litman

(57) ABSTRACT

A method for making an adsorbent composite can include activating dried lemon peel pieces to obtain activated lemon peel pieces; pyrolyzing the activated lemon peel pieces to obtain activated lemon peel char; dissolving at least one polymer in an organic solvent to obtain a polymer solution; dispersing the activated lemon peel char in the polymer solution to obtain a mixture; extracting the organic solvent from the mixture to obtain a composite; and annealing the composite to provide the adsorbent composite.

18 Claims, No Drawings

ADSORBENT USING BIOWASTE AND PLASTIC WASTE FOR WASTEWATER TREATMENT

FIELD AND BACKGROUND

The disclosure of the present application relates to a method for preparing activated carbon flakes, and particularly to activated carbon flakes made using lemon peel with polypropylene and polyethylene.

DESCRIPTION OF THE PRIOR ART

Water covers about 71% of the Earth's surface. It is essential for the existence of all forms of life. Humans, microbes, plants, trees, and aquatic animals depend on water to survive. Without water, all living organisms will fail to exist.

Water also plays an important role in the world economy. It is a critical resource for agricultural production and plays an important role in global food security. Water is also a fundamental commodity, used by many industries, for almost every step of manufacturing and production processes around the world. Some examples of these industries are textile, leather, cosmetic, paint, food processing, pharmaceutical, plastic, paper, printing, and dyeing.

However, most of the mentioned industries are known to discharge dyes from their waste effluents which ends up in the environment, causing water pollution in the wastewater. Some examples of these dyes are Gentian violet, methylene blue, methyl orange, rhodamine B, and Congo red. These dyes are non-biodegradable, extremely toxic, and may be carcinogenic. In humans, Gentian violet dye is known to cause gastrointestinal irritation, depression in the white blood cell count via intravenous injection, blindness if swallowed, and eye and skin irritation. If the wastewater containing these dyes are left untreated, it poses a serious risk to the aquatic ecosystem since the dyes prevent sunlight from entering the water resulting in impairment of plant photosynthesis.

There are several methods available for the removal of dyes, such as activated carbon powder, membrane separation, coagulation, ozonation, electrochemical coagulation, photocatalytic degradation, cation exchange membranes, and adsorption. Activated carbon powder requires a filtration membrane to separate the filtrate and the adsorbent. Known adsorbents have a low adsorption capacity for the sorption of dyes.

In light of the above, a need remains for an efficient, rapid, cost-effective, and environmentally friendly method for preparing an adsorbent for removal of pollutants from aqueous media.

SUMMARY

The present subject matter relates to a method of preparing porous, activated carbon adsorbent flakes with a high surface area. The adsorbent flakes can be used for enhanced removal of pollutants from wastewater.

In one embodiment, the method of making an adsorbent composite includes obtaining lemon peels; cutting and drying the lemon peels to obtain lemon peel pieces; activating the dried lemon peel pieces to obtain activated lemon peel pieces; pyrolyzing the activated lemon peel pieces to obtain activated lemon peel char; dissolving at least one polymer in an organic solvent to obtain a polymer solution; dispersing the activated lemon peel char in the polymer solution to obtain a mixture; extracting the organic solvent from the mixture to obtain a composite; and annealing the composite to provide the adsorbent composite.

In an embodiment, the at least one polymer can include polypropylene.

In an embodiment, the at least one polymer can include polypropylene and ultrahigh molecular weight polyethylene.

In another embodiment, the organic solvent can be selected from the group consisting of p-xylene, o-xylene, m-xylene, an isomeric mixture of xylenes, p-cymene, o-cymene, m-cymene, limonene, toluene, mesitylene, other aromatic hydrocarbons, and mixtures thereof.

In another embodiment, the organic solvent can comprise p-xylene.

In a further embodiment, the method can include cutting the adsorbent to provide adsorbent flakes.

In an embodiment, the adsorbent flakes can have sizes ranging from about 3 mm to about 30 mm.

In an embodiment, the lemon peels can be dried under the sun for about two days or in a hot air oven at a temperature of about 110° C. for about 1 hour to about 2 hours.

In another embodiment, the dried lemon peel pieces can be activated by immersing the dried lemon peel pieces in a solution including 2N KOH.

In another embodiment, the activated lemon peel pieces can be pyrolyzed at a temperature ranging from about 200° C. to about 1000° C. at a residence time ranging from about 30 minutes to about 5 hours.

In another embodiment, dissolving the at least one polymer in the organic solvent can include: heating the organic solvent containing the at least one polymer to a temperature ranging from about 120° C. to about 140° C.; and stirring the organic solvent containing the at least one polymer for about 20 minutes to about 40 minutes.

In another embodiment, the annealing can include heating of the composite at a temperature of about 160° C. to about 170° C. for about 2 minutes to about 1 hours.

In a further embodiment, the present subject matter relates to a method of removing a pollutant from an aqueous solution. The method includes contacting the absorbent composite with the aqueous solution.

In an embodiment, the adsorbent composite can be packed in a non-woven porous fabric prior to contacting the aqueous solution.

In an embodiment, the aqueous solution can include wastewater.

In a further embodiment, the pollutant can include organic dyes.

In an embodiment, the organic dyes can be selected from the group consisting of Rhodamine B, Alizarin red, Indigo carmine, Gentian violet, and a mixture thereof.

In an embodiment, the organic dyes can comprise Gentian violet.

These and other features of the present subject matter will become readily apparent upon further review of the following specification.

DETAILED DESCRIPTION

The following definitions are provided for the purpose of understanding the present subject matter and for construing the appended patent claims. The definitions are not meant to be limiting to the subject matter described herein.

Definitions

Throughout the application, where systems are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a system or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a method of preparing a porous, activated carbon adsorbent with a high surface area. The adsorbent can take the form of flakes and can be used for enhanced removal of pollutants from wastewater.

In one embodiment, the method of making an adsorbent composite includes obtaining lemon peels; cutting and drying the lemon peels to obtain lemon peel pieces; activating the dried lemon peel pieces to obtain activated lemon peel pieces; pyrolyzing the activated lemon peel pieces to obtain activated lemon peel char; dissolving at least one polymer in an organic solvent to obtain a polymer solution; dispersing the activated lemon peel char in the polymer solution to obtain a mixture; extracting the organic solvent from the mixture to obtain a composite; and annealing the composite to provide the absorbent composite.

In an embodiment, the method can include obtaining about 1 kg of the lemon peels and washing the lemon peels with water to remove any pulp impurities. The washed lemon peels can then be cut into small pieces and dried by any suitable means. In an embodiment, the cut lemon peel pieces can be dried by exposure to sunlight, for example, for about two days. In an alternative embodiment, the cut lemon peel pieces can be dried in a hot air oven at a temperature of about 110° C. for about 1 hour to about 2 hours. In an embodiment, drying about 1 kg of lemon peel pieces can yield an amount of dried lemon peel pieces ranging from about 800 grams to about 900 grams of dried lemon peel pieces.

The dried lemon peel pieces can be activated, or alkali-activated, by immersing the dried lemon peel pieces in a solution including 2N KOH and stirring overnight, or for about 12 hours to about 24 hours. In an embodiment, the 2N KOH can include mixing about 1000 mL of distilled water with about 56 g of KOH. Then, the activated, or alkali-activated, lemon peel pieces can be removed from the solution by filtering, neutralizing with distilled water, and drying. This step can yield about 800 grams to about 900 grams of activated, or alkali-activated, dried lemon peel pieces.

The activated lemon peel pieces can be pyrolyzed by placing the activated lemon peel pieces in a furnace programmed to achieve a temperature ranging from about 200° C. to about 1000° C. at a rate of about 2° C./min to about 20° C./min and a residence time ranging from about 30 minutes to about 5 hours. In an embodiment, the pyrolyzing of the activated lemon peel pieces in the furnace can be conducted at a temperature of about 600° C. at a rate of about 10° C./min and a residence time of about 3 hours.

In an embodiment, prior to placing the activated lemon peel pieces in a furnace, the activated lemon peel pieces can be wrapped in aluminum foil. In an alternative embodiment, prior to placing the activated lemon peel pieces in a furnace, the activated lemon peel pieces can be placed in a crucible without any covering. In an embodiment, the furnace for pyrolyzing is selected from the group consisting of a tubular furnace, muffle furnace, or hot furnace. The pyrolyzed activated lemon peel pieces can be cooled to room temperature at a rate of about 2° C./min to about 20° C./min to obtain activated lemon peel char. In an embodiment, the cooling can be conducted at a rate of about 10° C./min. This step can yield about 100 grams to about 300 grams of activated lemon peel char.

In an embodiment, the polymer solution can be prepared by combining at least one polymer with an organic solvent. Then, the polymer solution can be heated to a temperature ranging from about 120° C. to about 140° C. and stirred for about 20 minutes to about 40 minutes to dissolve the polymer solution thereby obtaining a clear solution. In an embodiment, the heating and stirring of the polymer solution can be conducted at a temperature of about 130° C. for about 30 minutes.

In an embodiment, the at least one polymer can include polypropylene. In another embodiment, the at least one polymer can include polypropylene and ultrahigh molecular weight polyethylene. In certain embodiments, the at least one polymer can include polypropylene and at least one polyethylene. The polypropylene used herein can come from a variety of sources, including virgin polypropylene, polypropylene waste from recycled polypropylene, one-time disposed of polypropylene, or recovered from a waste polypropylene material derived from post-consumer/industrial waste. In further embodiments, the polyethylene can be obtained from similar sources. Likewise, other forms of polyethylene are further contemplated as possible herein. For example, in another embodiment, the at least one polyethylene can be selected from the group consisting of high-density polyethylene, linear low-density polyethylene, ultrahigh molecular weight polyethylene, and combinations thereof.

In an embodiment, the organic solvent can be selected from the group consisting of p-xylene, o-xylene, m-xylene, an isomeric mixture of xylenes, p-cymene, o-cymene, m-cymene, limonene, toluene, mesitylene, other aromatic hydrocarbons, and mixtures thereof. In certain embodiments, the organic solvent can be p-xylene.

In certain embodiments, the polymer solution can be prepared by combining about 2 g of polypropylene, about 2 g of ultrahigh molecular weight polyethylene, and about 200 mL of p-xylene.

In an embodiment, the activated lemon peel char can be dispersed in the clear polymer solution and stirred for about 10 minutes to about 20 minutes to provide a uniform mixture. In an embodiment, the uniform mixture can be poured into a cylindrical beaker and the organic solvent can be extracted from the mixture to obtain a dried porous polypropylene-polyethylene char composite with less or no strength. In an embodiment, the extraction of the solvent can be conducted by placing the cylindrical beaker with the mixture inside of a vacuum hood. In an alternative embodiment, the extraction of the solvent can be conducted by applying a vacuum to the cylindrical beaker with the mixture inside thereof. This step can yield about 95 grams to about 100 grams of the dried porous char composite.

The dried porous polypropylene-polyethylene char composite can be annealed to obtain an adsorbent composite. In an embodiment, the dried porous polypropylene-polyethylene char composite within the cylindrical beaker can be heated inside a hot air oven at a temperature ranging from about 160° C. to about 170° C., or up to a melting point of the polypropylene, for a period of time ranging from about 2 minutes to about 1 hour. In an alternative embodiment, the dried porous polypropylene-polyethylene char composite within the cylindrical beaker can be heated on a Heidolph hot plate for about 2 minutes to about 5 minutes. This step can yield about 95 grams to about 100 grams of the adsorbent composite.

After annealing, a porous, activated carbon adsorbent composite can be produced in a single block, e.g., a cylindrical-shaped block. The block can be cut into small flakes having sizes ranging from about 3 mm to about 30 mm. In an alternative embodiment, the block can be cut into small flakes, each flake can have a diameter or thickness of about 5 mm and a length and breadth of about 5 cm. The composite flakes or porous, activated carbon adsorbent composite flakes can have a high adsorption capacity, sufficient strength, and a large surface area. This step can yield about 95 grams to about 100 grams of the adsorbent composite flakes.

In another embodiment, the present subject matter is directed to a method of removing a pollutant from an aqueous solution. The method includes contacting, by dispersing, the adsorbent composite flakes with the aqueous solution. In an alternative embodiment, the adsorbent composite flakes can be packed in a non-woven porous fabric prior to contacting the aqueous solution. Once contacted with the aqueous solution, the adsorbent composite flakes can adsorb dyes, ions, and/or other pollutants in the aqueous solution. In an embodiment, the pollutant can be organic dyes. In an embodiment, the organic dyes are selected from the group consisting of Rhodamine B, Alizarin red, Indigo carmine, Gentian violet, and a mixture thereof. In certain embodiments, the organic dyes can be Gentian violet. After use, the adsorbent composite flakes can be removed from the aqueous solution by any suitable means, e.g., by collecting with a net or other suitable tool. As the adsorbent composite flakes are large and less dense than water, they can float on the surface of water. As such, the adsorbent composite flakes can be collected easily after use, without requiring use of a filtration unit.

After collecting the used adsorbent composite flakes, the dyes can be desorbed from the adsorbent composite flakes so that the adsorbent composite flakes may be reused up to 5 times. In an embodiment, the dyes can be desorbed from the adsorbent composite flakes in an alcohol solution. The dyes can be desorbed with high efficiency.

In an additional embodiment, the adsorbent composite flakes described herein can be used to remove cations, anions, and/or heavy metal ions from a liquid, for example, from wastewater.

The following examples illustrate the present teachings.

EXAMPLES

Example 1

Preparation of Adsorbent

The process of conversion of biowaste lemon peels to a porous adsorbent with sufficient strength and a large surface area was conducted using the following steps.

Collection of the lemon peels: about 1 kg of biowaste lemon peels were collected and washed with water to remove any pulp impurities.

Drying of the lemon peels: The washed lemon peels were cut into small pieces by mechanical cutting and followed by drying. The drying was carried out under the sun, where it was kept for about two days. The drying can also be done in a hot air oven kept at about 110° C. for about 1 hour to about 2 hours. The yield in this step ranges between about 800 grams to about 900 grams.

Activation of the lemon peels: The dried lemon peel pieces were dipped in 2N KOH solution and stirred overnight. Then the lemon peel pieces were filtered and neutralized with distilled water and dried under shade. The yield in this step ranges between about 800 grams to about 900 grams.

Pyrolysis: The lemon peel pieces were wrapped in an aluminum foil and placed inside a tubular furnace. The tubular furnace was programmed to reach about 600° C. at about 10° C./min rate. The residence time was kept at about 600° C. for about 3 hours, followed by cooling to room temperature at the same rate of about 10° C./min. Thus, pyrolyzed lemon peel char was obtained. The yield in this step ranges between about 100 grams to about 300 grams.

Dissolution of polypropylene: about 2 g of polypropylene, about 2 g of ultrahigh molecular weight polyethylene were taken in a round-bottomed flask and about 200 mL of p-xylene was added to it. Then the solution was heated to about 130° C. and stirred for about 30 minutes to dissolve the polymer.

Dispersion of activated lemon peel char: After obtaining a clear solution, the activated lemon peels char (about 96 g) was dispersed in the polymer solution for and stirred for about 10 to about 20 minutes to achieve uniform mixture. Then the dispersed solution was poured into a cylindrical beaker whose height was more than its diameter. Then the solvent was extracted either by keeping it inside a hood or by applying a vacuum to obtain a dried porous adsorbent with less or no strength. The yield in this step ranges between about 95 grams to about 100 grams.

Annealing: The beaker with the polymer-lemon peel char composite was subjected to annealing at a temperature range of about 160° C. to about 170° C. or up to the melting point of the polypropylene for about 25 minutes inside a hot air oven or about 2 minutes to about 5 minutes on a Heidolph hot plate. The activated lemon peel char-polymer composite adsorbent was removed from the beaker. Then the adsorbent was cut into small flakes with a diameter or thickness of about 5 mm and a length and breadth of about 5 cm each. The yield in this step ranges between about 95 grams to about 100 grams.

Example 2

Removal of Dye

The adsorbent flakes as described herein were used for dye adsorption by directly subjecting the adsorbent flakes to polluted water or packed in a nonwoven porous fabric. The porous adsorbent adsorbed the dye and reduced the pollutant content inside the water.

It is to be understood that the method for preparing an adsorbent from palm fiber char and at least one polymer is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of making an adsorbent composite from lemon peel and a polymer, the method comprising:
   obtaining lemon peels;
   cutting and drying the lemon peels to obtain lemon peel pieces;
   activating the dried lemon peel pieces to obtain activated lemon peel pieces;
   pyrolyzing the activated lemon peel pieces to obtain activated lemon peel chars;
   dissolving at least one polymer in an organic solvent to obtain a polymer solution;
   dispersing the activated lemon peel chars in the polymer solution to obtain a mixture;
   extracting the organic solvent from the mixture to obtain a composite; and
   annealing the composite to provide the adsorbent composite.

2. The method of making an adsorbent composite of claim 1, wherein the at least one polymer comprises polypropylene.

3. The method of making an adsorbent composite of claim 1, wherein the at least one polymer comprises polypropylene and ultrahigh molecular weight polyethylene.

4. The method of making an adsorbent composite of claim 1, wherein the organic solvent is selected from the group consisting of p-xylene, o-xylene, m-xylene, an isomeric mixture of xylenes, p-cymene, o-cymene, m-cymene, limonene, toluene, mesitylene, other aromatic hydrocarbons, and mixtures thereof.

5. The method of making an adsorbent composite of claim 4, wherein the organic solvent is p-xylene.

6. The method of making an adsorbent composite of claim 1, further comprising cutting the adsorbent to provide adsorbent flakes.

7. The method of making an adsorbent composite of claim 6, wherein the adsorbent flakes have sizes ranging from about 3 mm to about 30 mm.

8. The method of making an adsorbent composite of claim 1, wherein the lemon peels are dried under the sun for about two days or in a hot air oven at a temperature of about 110° C. for about 1 hour to about 2 hours.

9. The method of making an adsorbent composite of claim 1, wherein the dried lemon peel pieces are activated by immersing the dried lemon peel pieces in a solution including 2N KOH.

10. The method of making an adsorbent composite of claim 1, wherein the activated lemon peel pieces are pyrolyzed at a temperature ranging from about 200° C. to about 1000° C. at a residence time ranging from about 30 minutes to about 5 hours.

11. The method of making an adsorbent composite of claim 1, wherein dissolving the at least one polymer in the organic solvent comprises:
    heating the organic solvent containing the at least one polymer to a temperature ranging from about 120° C. to about 140° C.; and
    stirring the organic solvent containing the at least one polymer for about 20 minutes to about 40 minutes.

12. The method of making an adsorbent composite of claim 1, wherein the annealing comprises heating of the composite at a temperature of about 160° C. to about 170° C. for about 2 minutes to about 1 hours.

13. A method of removing a pollutant from an aqueous solution, comprising contacting the adsorbent composite as prepared in claim 1 with the aqueous solution.

14. The method of claim 13, wherein the adsorbent composite is packed in a non-woven porous fabric prior to contacting the aqueous solution.

15. The method of claim 13, wherein the aqueous solution comprises wastewater.

16. The method of claim 13, wherein the pollutant comprises organic dyes.

17. The method of claim 16, wherein the organic dyes are selected from the group consisting of Rhodamine B, Alizarin red, Indigo carmine, Gentian violet, and a mixture thereof.

18. The method of claim 17, wherein the organic dyes comprise Gentian violet.

\* \* \* \* \*